(12) United States Patent
Toya

(10) Patent No.: US 10,110,029 B2
(45) Date of Patent: Oct. 23, 2018

(54) METHOD FOR CONTROLLING SERVER DEVICE, AND SERVER DEVICE

(71) Applicant: Panasonic Intellectual Property Management Co., Ltd., Osaka (JP)

(72) Inventor: Shoichi Toya, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 44 days.

(21) Appl. No.: 15/387,561

(22) Filed: Dec. 21, 2016

(65) Prior Publication Data

US 2017/0201110 A1    Jul. 13, 2017

(30) Foreign Application Priority Data

Jan. 8, 2016 (JP) ................................ 2016-003036

(51) Int. Cl.
| | | |
|---|---|---|
| H02J 7/00 | (2006.01) | |
| H01M 10/48 | (2006.01) | |
| H02J 7/02 | (2016.01) | |

(52) U.S. Cl.
CPC ........... *H02J 7/0047* (2013.01); *H01M 10/48* (2013.01); *H02J 7/0004* (2013.01); *H02J 7/02* (2013.01)

(58) Field of Classification Search
CPC .................................................. H02J 7/0047
USPC ........................................................ 320/106
See application file for complete search history.

(56) References Cited

U.S. PATENT DOCUMENTS

| | | | | |
|---|---|---|---|---|
| 7,693,609 | B2* | 4/2010 | Kressner | B60L 11/14 320/109 |
| 8,831,677 | B2* | 9/2014 | Villa-Real | H04M 1/66 455/552.1 |
| 9,521,444 | B2* | 12/2016 | Matsuzaki | H04N 21/25866 |
| 9,787,123 | B2* | 10/2017 | Kaji | H02J 3/32 |
| 9,931,539 | B1* | 4/2018 | de Pablos | A63F 13/218 |
| 2004/0004559 | A1* | 1/2004 | Rast | G02B 27/017 341/34 |
| 2012/0091972 | A1* | 4/2012 | Narel | B60L 11/1838 320/162 |

(Continued)

FOREIGN PATENT DOCUMENTS

JP  2004-222457  8/2004

*Primary Examiner* — M'Baye Diao
(74) *Attorney, Agent, or Firm* — Greenblum & Bernstein, P.L.C.

(57) ABSTRACT

A method is provided that includes: receiving identification information of a power storage device that is connected to a charging device, and a value indicating the state of a storage battery included in the power storage device. The method also includes associating to each other and storing the identification information of the power storage device and the value indicating the state of the storage battery. Additionally, the method includes determining the possibility of charging the power storage device by comparing the received value indicating the state of the storage battery with a value indicating a past state of the storage battery that is stored and corresponds to the received identification information of the power storage device. The method further includes transmitting information indicating the determined possibility of charging the power storage device to at least one of the charging device and the power storage device.

5 Claims, 7 Drawing Sheets

(56) References Cited

U.S. PATENT DOCUMENTS

2015/0372519 A1* 12/2015 Abe ..................... H02J 7/0055
                                                    320/107
2016/0116932 A1*  4/2016 Yokoyama ............... H02J 3/00
                                                    700/295

* cited by examiner

METHOD FOR CONTROLLING SERVER DEVICE, AND SERVER DEVICE

BACKGROUND

1. Technical Field

The present disclosure relates to a method for controlling a server device and the like with which a power storage device is managed.

2. Description of the Related Art

To date, various charging systems have been proposed for charging power storage devices provided with storage batteries. For example, Japanese Unexamined Patent Application Publication No. 2004-222457 discloses a charging system in which a charging device for a power storage device is managed by means of a central management device via a communication line.

SUMMARY

The performance of a storage battery of a power storage device declines, that is, deteriorates, as the storage battery is used. Furthermore, abnormalities may occur in the storage battery of a power storage device. Continued use of a storage battery in which an abnormality or deterioration has occurred causes inconvenience for the user thereof. In light of the aforementioned circumstances, a non-limiting and exemplary embodiment provides a method for controlling a server device and the like with which a power storage device is managed on the basis of the state of a storage battery of the power storage device.

In one general aspect, the techniques disclosed here feature a method includes: (a) receiving identification information of a power storage device that is connected to a charging device, and a value indicating the state of a storage battery included in the power storage device, from at least one of the charging device and the power storage device; (b) associating to each other and storing the identification information of the power storage device and the value indicating the state of the storage battery; (c) prior to charging of the power storage device by the charging device being started, determining the possibility of charging the power storage device by comparing the value indicating the state of the storage battery received from at least one of the charging device and the power storage device with a value indicating a past state of the storage battery that is stored and corresponds to the identification information of the power storage device received from at least one of the charging device and the power storage device; and (d) transmitting information indicating the determined possibility of charging the power storage device to at least one of the charging device and the power storage device.

With the method and the like according to the aspect of the present disclosure, the power storage device can be managed on the basis of the state of the storage battery of the power storage device.

It should be noted that comprehensive or specific aspects of the abovementioned configuration may be realized by a device, a method, an integrated circuit, a computer program, or a non-transitory recording medium such as a computer-readable CD-ROM, or may be realized by an arbitrary combination of a system, a device, a method, an integrated circuit, a computer program, and a recording medium.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

Figure 1:
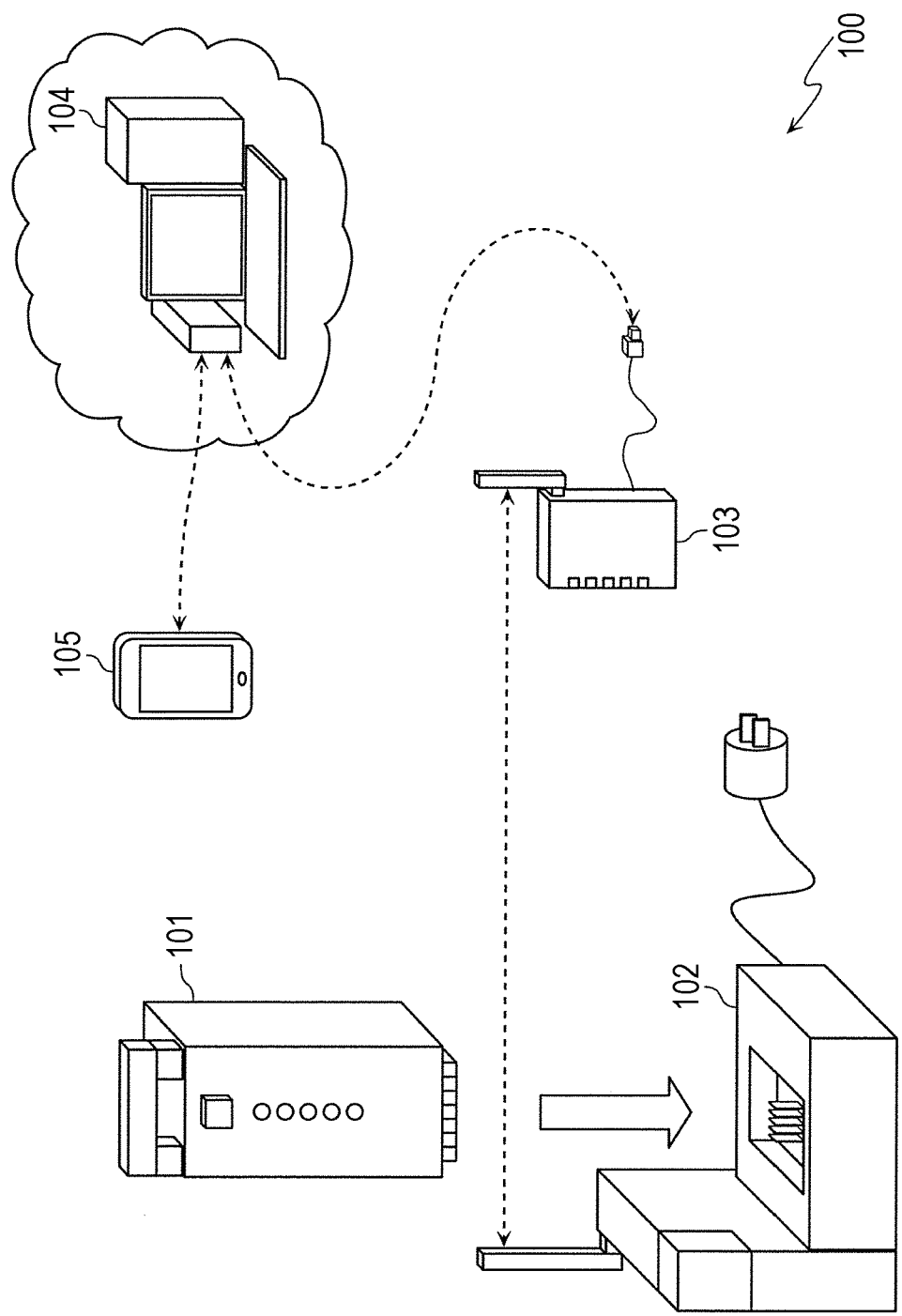
FIG. 1 is a conceptual diagram schematically depicting a charging system including a server device according to an embodiment.

DETAILED DESCRIPTION (Findings Forming the Basis for the Present Disclosure)

The present inventor discovered the following problem with regard to the charging system described in the "Description of the Related Art" section in which a charging device for a power storage device is managed by means of a central management device via a communication line. Rental systems have been devised in which power storage devices provided with storage batteries are rented, and in such rental systems, there are cases where a usage fee corresponding to the number of times that a power storage device has been charged is billed to the borrower of the power storage device. In these cases, if an abnormality or deterioration occurs in a storage battery, the amount of power that can be stored in the storage battery in one charge decreases, and the frequency of charging subsequently increases. This results in a disadvantage for the borrower of the power storage device. Therefore, it is necessary to determine the state of the power storage device being rented, and manage the charging of the power storage device on the basis of that determination. It should be noted that a borrower is an example of a user of a power storage device, and there is no restriction thereto. The same is also true hereinafter.

Thus, a method according to a first aspect of the present disclosure includes: (a) receiving identification information of a power storage device that is connected to a charging device, and a value indicating the state of a storage battery included in the power storage device, from at least one of the charging device and the power storage device; (b) associating to each other and storing the identification information of the power storage device and the value indicating the state of the storage battery; (c) prior to charging of the power storage device by the charging device being started, determining the possibility of charging the power storage device by comparing the value indicating the state of the storage battery received from at least one of the charging device and the power storage device with a value indicating a past state of the storage battery that is stored and corresponds to the identification information of the power storage device received from at least one of the charging device and the power storage device; and (d) transmitting information indicating the determined possibility of charging the power storage device to at least one of the charging device and the power storage device.

Thus, in the method, whether the state of the storage battery of the power storage device is appropriate or inappropriate for charging is determined from the value indicating the state of the storage battery and the past information indicating the state of the storage battery. Thus, inappropriate charging of the storage battery may be suppressed. Consequently, it becomes possible to manage the power storage device on the basis of the state of the storage battery of the power storage device.

It should be noted that the connection between the power storage device and the charging device may include an electrical connection. The electrical connection may be a wired connection or may be a wireless connection. In the step (a), in the case where receiving is performed from the charging device and the power storage device, an example may be included in which identification information of the charging device is received by the server device from the charging device, and the identification information of the power storage device and the value indicating the state of the storage battery are received from the power storage device. Furthermore, in the step (a), in the case where receiving is performed from the charging device and the power storage device, an example may also be included in which the identification information of the power storage device and the value indicating the state of the storage battery are received from each of the charging device and the power storage device. Also, in the case where receiving such as the abovementioned is performed, either of the two abovementioned examples is permissible. Furthermore, the receiving in the step (a) may include the case where the value indicating the state of the storage battery is received prior to new charging being started in order to determine the possibility of charging the power storage device, and the case where the value indicating the state of the storage battery is received for the storing in the step (b). The step (b) may be carried out on the basis of the identification information of the power storage device and the value indicating the state of the storage battery received in the step (a) that has been carried out when the power storage device has been charged in a neighboring period (the previous time, for example) prior to the new charging, and the power storage device identification information and the value indicating the state of the storage battery may be associated and stored as data such as history data of the state of the storage battery.

The abovementioned data may be data received in the step (a) that has been carried out prior to processing for starting charging, may be data received in the step (a) that has been carried out during charging processing, or may be data received in the step (a) that has been carried out after charging processing. Data that has been received in the step (a) carried out at appropriately selected timings, from before the start of charging to after charging processing, when the power storage device has been charged may be stored as data such as history data.

With regard to a method according to a second aspect of the present disclosure, in the method for controlling the server device of the first aspect, in the step (c), prior to charging of the power storage device by the charging device being started, when the value indicating the state of the storage battery received by at least one of the charging device and the power storage device has changed by less than a threshold value compared to the value indicating the past state of the storage battery, charging the power storage device may be determined as being possible, and, prior to charging of the power storage device by the charging device being started, when the value indicating the state of the storage battery received by at least one of the charging device and the power storage device has changed by equal to or greater than the threshold value compared to the value indicating the past state of the storage battery, charging the power storage device may be determined as not being possible.

Thus, the possibility of charging the power storage device is determined prior to the charging of the power storage device being started. When the amount of change in the value indicating the state of the storage battery received by at least one of the charging device and the power storage device with respect to the value indicating the past state of the storage battery is equal to or greater than the threshold value, charging the power storage device is determined as not being possible. For example, if the abovementioned value indicating the state of the storage battery is taken as a parameter relating to the soundness of the storage battery, in the case where the abovementioned amount of change in the value indicating the state of the storage battery becomes equal to or greater than the threshold value, it can be deemed that the storage battery is in an unsound state. Thus, charging of the storage battery in an unsound state is suppressed.

With regard to a method according to a third aspect of the present disclosure, in the method of the first aspect, in the step (c), prior to charging of the power storage device by the charging device being started, when the value indicating the state of the storage battery received by at least one of the charging device and the power storage device has changed by equal to or greater than a threshold value compared to the value indicating the past state of the storage battery, charging the power storage device may be determined as being possible, and, prior to charging of the power storage device by the charging device being started, when the value indicating the state of the storage battery received by at least one of the charging device and the power storage device has changed by less than the threshold value compared to the value indicating the past state of the storage battery, charging the power storage device may be determined as not being possible.

Thus, the possibility of charging the power storage device is determined prior to the charging of the power storage device being started. When the amount of change in the value indicating the state of the storage battery received by at least one of the charging device and the power storage device with respect to the value indicating the past state of the storage battery is less than the threshold value, charging the power storage device is determined as not being possible. For example, when the abovementioned value indicating the state of the storage battery is taken as a parameter relating to the charged state of the storage battery, if the abovementioned amount of change in the value indicating the state of the storage battery is less than the threshold value, there are cases where the storage battery is charged not in a completely discharged state or even a state near thereto but in a state in which the discharged amount is a small amount. Thus, repeated charging and discharging of the storage battery at small amounts is suppressed, and progression of the deterioration of the storage battery is thereby suppressed.

Furthermore, in a method according to a fourth aspect of the present disclosure, in the method of the third aspect, prior to charging of the power storage device by the charging device being started, the value indicating the state of the storage battery received by at least one of the charging device and the power storage device may be the capacity of the storage battery from prior to the charging of the power storage device by the charging device being started, and the value indicating the past state of the storage battery may be the capacity from when charging of the storage battery has been completed in the past. Thus, it is possible for the value indicating the state of the storage battery to be taken as the capacity of the storage battery, which is a parameter relating to the charged state of the storage battery.

Furthermore, a server device according to a fifth aspect of the present disclosure includes: a receiver that receives identification information of a power storage device that is connected to a charging device, and a value indicating the state of a storage battery included in the power storage device, from at least one of the charging device and the power storage device; a storage that associates to each other and stores the identification information of the power storage device and the history of the value indicating the state of the storage battery; a determiner that determines the possibility of charging the power storage device by comparing the value indicating the state of the storage battery received by the receiver with a value indicating a past state of the storage battery that corresponds to the identification information of the power storage device received by the receiver and is stored in the storage; and a transmitter device that transmits information indicating the possibility of charging the power storage device determined by the determiner to at least one of the charging device and the power storage device.

Thus, the server device determines whether the state of the storage battery of the power storage device is appropriate or inappropriate for charging from the value indicating the state of the storage battery and the past information indicating the state of the storage battery. Thus, inappropriate charging of the storage battery may be suppressed.

It should be noted that a comprehensive or specific aspect of the abovementioned configuration may be realized by a device, a method, an integrated circuit, a computer program, or a non-transitory recording medium such as a computer-readable CD-ROM, or may be realized by an arbitrary combination of a system, a device, a method, an integrated circuit, a computer program, and a recording medium.

Hereinafter, an embodiment will be described in a specific manner with reference to the drawings. It should be noted that the embodiment described hereinafter represents a comprehensive or specific example. The numerical values, the shapes, the materials, the constituent elements, the arrangement positions and modes of connection of the constituent elements, the steps, the order of the steps and the like given in the following embodiment are examples and are not intended to restrict the present disclosure. Furthermore, from among the constituent elements in the following embodiment, constituent elements that are not described in the independent claims indicating the most significant concepts are described as optional constituent elements. Furthermore, with regard to notation, ordinal numbers such as first, second, and third may be added, as appropriate, to the constituent elements and the like.

Furthermore, the drawings are schematic views and are not always depicted in an exact manner. In addition, in the drawings, constituent elements that are substantially the same are denoted by the same reference symbols, and there are cases where redundant descriptions are omitted or simplified. Furthermore, in the description of the embodiment hereinafter, there are cases where expressions accompanied by "substantially" such as substantially parallel and substantially orthogonal have been used. For example, substantially parallel does not only mean completely parallel but also means substantially parallel, in other words, that a difference of the order of several percent, for example, is included. The same is also true for other expressions accompanied by "substantially".

Embodiment

FIG. 1 is a conceptual diagram depicting a schematic configuration of a charging system 100 including a server device 104 according to the present embodiment. The charging system 100 is provided with a power storage device 101, a charging device 102, a router 103, a server device 104, and a communication terminal 105. The power storage device 101 includes one or more storage batteries that can be charged and discharged. The present disclosure is not restricted thereto; however, in the present embodiment, a description is given with the power storage device 101 being treated as a product that is rented to a borrower and is rented out as a set with the charging device 102.

The power storage device 101 is configured so as to be electrically connected to the charging device 102. The power storage device 101 is able to receive a supply of power from the charging device 102 via the electrical connection. The power storage device 101 may be electrically connected to the charging device 102 by being physically connected to the charging device 102, or may be electrically connected to the charging device 102 without being physically connected to the charging device 102. For example, the power storage device 101 may be electrically connected by being physically connected to the charging device 102 via a connector, a terminal, or the like, and may receive a supply of power from the charging device 102. Alternatively, the power storage device 101 may be electrically connected by approaching the charging device 102 without being physically connected to the charging device 102, and may receive a supply of power from the charging device 102 by means of a non-contact power supply system, that is, wirelessly.

In addition, the power storage device 101 is configured so as to carry out the transmission and reception of signals with respect to the charging device 102 by means of wired communication or wireless communication. For example, short-range wireless communication such as Bluetooth (registered trademark), ZigBee (registered trademark), or the like may be applied for the wireless communication between the power storage device 101 and the charging device 102. In the present embodiment, the power storage device 101 is configured so as to be mounted on a terminal of the charging device 102, and is thereby able to receive a supply of power from the charging device 102 via the terminal, and is able to communicate with the charging device 102 by way of short-range wireless communication.

The charging device 102 is electrically connected to a power source such as a power system, and supplies power from the power source to the power storage device 101. In the case where the power source is an alternating-current power source such as a power system, the charging device 102 converts the alternating-current power from the power source into direct-current power and supplies the direct-current power to the power storage device 101. In the case where the power source is a direct-current power source, the charging device 102 supplies the direct-current power of the power source to the power storage device 101. In the present embodiment, the charging device 102 is configured so as to be electrically connected to a power system. In addition, the charging device 102 is configured so as to communicate with the server device 104 via the router 103 or the like. It should be noted that the charging device 102 may be configured so as to communicate directly with the server device 104 rather than via the router 103 or the like. Wired communication may be applied or wireless communication may be applied for the abovementioned communication.

The router 103 is a communication device for relaying communication between the charging device 102 and the server device 104. Specifically, the router 103 is a relay device for the charging device 102 to communicate with the server device 104 via a communication network such as the Internet. For example, for the communication between the router 103 and the charging device 102, a wireless local area network (LAN) such as Wi-Fi (Wireless Fidelity) (registered trademark) may be applied, wired communication using cables may be applied, or other wireless communication or wired communication may be applied. The router 103 is connected to the communication network such as the Internet by way of wired communication such as a wired LAN or wireless communication such as a wireless LAN. In the present embodiment, a wireless LAN is applied for the communication between the router 103 and the charging device 102, and the router 103 is connected to the Internet by way of wired communication. Therefore, the charging device 102 and the router 103 can be arranged in a house or the like of the borrower of the power storage device 101, in an environment in which it is possible for the router 103 to connect to the Internet by way of wired communication.

The server device 104 is a device that manages charging of the power storage device 101 using the charging device 102. The server device 104 may be an information processing device such as a computer. The server device 104 may include one or more server devices, and may make up a cloud system. The server device 104 communicates with the charging device 102 via the communication network such as the Internet, and manages charging of the power storage device 101 using the charging device 102. In the present embodiment, as mentioned above, the server device 104 communicates with the charging device 102 via the Internet.

Furthermore, the server device 104 may be able to communicate with the communication terminal 105. For the communication between the server device 104 and the communication terminal 105, a mobile communication specification used by a mobile communication system such as the third-generation mobile communication system (3G), the fourth-generation mobile communication system (4G), or LTE (registered trademark) may be applied. More specifically, International Mobile Telecommunications (IMT)-2000, IMT-Advanced, or the like may be applied.

The communication terminal 105 is a device that is able to communicate with the server device 104 and the like. The communication terminal 105 may be an information processing device such as a computer. More specifically, the communication terminal 105 may be a mobile telephone, or may be a mobile terminal such as a smartphone, smartwatch, and tablet, or a small personal computer. In the present embodiment, the communication terminal 105 is a communication terminal of the borrower of the power storage device 101 and the charging device 102.

Figure 2:
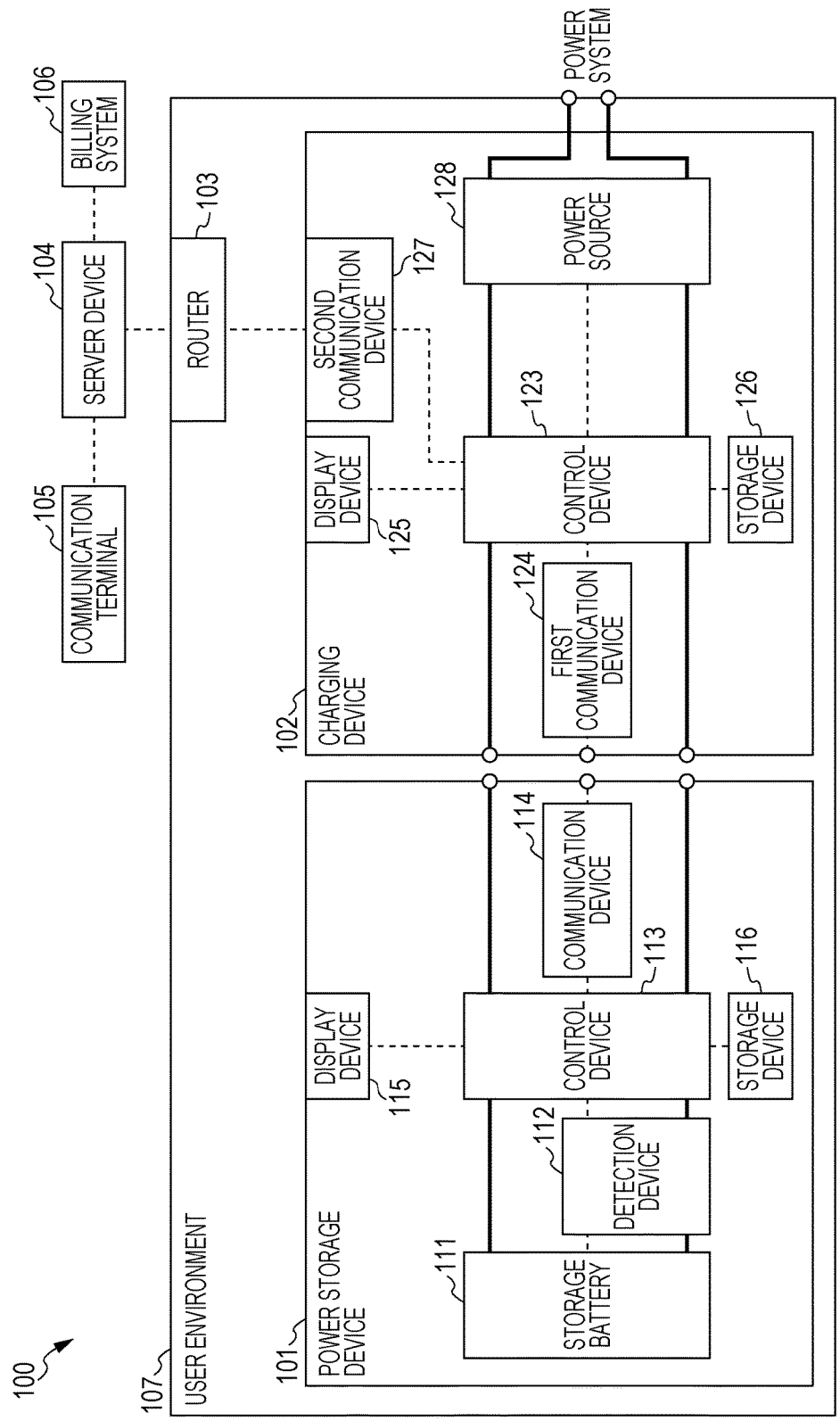
FIG. 2 is a block diagram depicting a configuration of the charging system including the server device according to the embodiment.

A detailed configuration of the power storage device 101, the charging device 102, and the server device 104 will be described with reference to FIG. 2. It should be noted that FIG. 2 is a block diagram depicting a configuration of the charging system 100 including the server device 104 according to the embodiment. The power storage device 101 is provided with a storage battery 111, a detection device 112, a control device 113, a communication device 114, a display device 115, and a storage device 116.

The storage battery 111 is a constituent element that can store and discharge electrical energy. The storage battery 111 may be a secondary battery single cell that can be charged and discharged such as a lithium-ion secondary battery or a nickel-hydrogen battery, or may be a battery pack made up of a plurality of single cells.

The detection device 112 is a constituent element that detects the state of the storage battery 111. Specifically, the detection device 112 can detect the charging voltage, the discharging voltage, the internal resistance, and the like of the storage battery 111. In addition, the detection device 112 may detect an amount of remaining electricity, which is the amount of electricity stored in the storage battery 111, or may detect the charging rate of the storage battery 111. The detection device 112 may be configured so as to send a detection result to the control device 113, or may be configured so as to send a detection result to the storage device 116. For example, the detection device 112 may be configured from a voltmeter, an ammeter, or the like.

The storage device 116 is a constituent element that stores a variety of information. The storage device 116 may be configured from a semiconductor memory or the like, or may be configured from a volatile memory, a nonvolatile memory, or the like. Furthermore, the storage device 116 may be a read-only memory, namely a non-rewritable memory. The storage device 116 stores information relating to the power storage device 101, detection results of the detection device 112, and the like. The information relating to the power storage device 101 may include identification information such as an identification number of the power storage device 101, design information of the power storage device 101, manufacturing information of the storage battery 111, and the like. The design information of the power storage device 101 may include the quantity of single cells in the storage battery 111, the mode of connection such as a series connection or parallel connection of the single cells, the electrical capacity (unit: Ah or the like) of the power storage device 101, and the like. The manufacturing information of the storage battery 111 may include manufacturing information relating to single cells of the storage battery 111, and, specifically, may include the type, the electrical capacity, the manufacturer, the manufacturing date, the manufacturing location, the product number, the manufacturing lot, or the like of the single cells.

The communication device 114 is a constituent element for the power storage device 101 to communicate with the charging device 102 and the like. The communication device 114 may be a communication circuit including a communication interface. The communication device 114 communicates with the charging device 102 and the like in accordance with control implemented by the control device 113. Specifically, the communication device 114 is configured so as to communicate with a first communication device 124 of the charging device 102 by means of wired communication or wireless communication, and to transmit and receive information with the first communication device 124. In the present embodiment, the communication device 114 communicates with the first communication device 124 by means of short-range wireless communication.

The display device 115 is a constituent element that displays information. The display device 115 may be a liquid crystal panel or may be an indicator. The display device 115 may display information in accordance with control implemented by the control device 113. Specifically, the display device 115 may display information relating to the power storage device 101, and, for example, may display the amount of remaining electricity of the storage battery 111, a mid-charge display indicating that the power storage device 101 is being charged, a charging completion display, a discharging display indicating that the power storage device 101 is in a discharging state, a notification of an abnormality that has occurred in the power storage device 101, or the like.

The control device 113 is a constituent element that controls an operation of the power storage device 101. For example, the control device 113 may be provided with a converter that controls the charging and discharging of the storage battery 111. A device provided with a control function is sufficient for the control device 113, and this may be realized in any manner. For example, the control device 113 may be configured by using dedicated hardware. Furthermore, for example, the control device 113 may be realized by executing a software program suitable for the constituent elements. In this case, the control device 113, for example, may be provided with a computation processing unit (not depicted) and a storage unit (not depicted) that stores a control program. A possible example of the computation processing unit is a microprocessing unit (MPU) or a central processing unit (CPU). A possible example of the storage unit is a memory or the like. It should be noted that the control device 113 may be constituted by an individual control device that performs centralized control, or may be constituted by a plurality of control devices that cooperate with each other to perform distributed control.

The control device 113 is able to control the detection device 112, the communication device 114, and the display device 115, store information in the storage device 116, read information stored in the storage device 116, and the like. Specifically, the control device 113 controls the detection device 112 to acquire the state of the storage battery 111. The control device 113 controls the communication device 114 to transmit and receive information with the charging device 102. The control device 113 controls the display device 115 to display information.

The control device 113 may calculate a value indicating the state of the storage battery 111 from a value indicating the state of the storage battery 111 received from the detection device 112, a charging/discharging result of the storage battery 111, and the like, and may store the calculated value in the storage device 116. For example, the control device 113 may calculate a value for a parameter such as the total charge/discharge count, the learned capacity, the total usage time, the number of charge/discharge cycles, the full charge count, the storage battery capacity, and the total charged/discharged amount of the storage battery 111.

The total charge/discharge count may be handled by totaling the total charge count, which is the total number of times that the storage battery 111 has been charged, and the total discharge count, which is the total number of times that the storage battery 111 has been discharged, or the total charge count and the total discharge count of the storage battery 111 may be handled separately. One instance of charging may be counted as one instance if simply one instance of charging is carried out with respect to the storage battery 111, and one instance of discharging may be counted as one instance if simply one instance of discharging is carried out with respect to the storage battery 111. Alternatively, rather than each simple charge being counted despite being carried out one or more times, one instance of charging may be counted as one instance each time the sum of the amount charged to the storage battery 111 reaches the value for the full charge capacity. Similarly, rather than each simple discharge being counted despite being carried out one or more times, one instance of discharging may be counted as one instance each time the sum of the amount discharged from the storage battery 111 reaches the value for the full charge capacity. For example, in the case where charging with which the amount charged to the storage battery 111 reaches the value for the full charge capacity is counted as one instance of charging, and discharging with which the amount discharged from the storage battery 111 reaches the value for the full charge capacity is counted as one instance of discharging, the charged amount or the discharged amount being 50% of the value for the full charge capacity is taken as 0.5 of an instance of charging or discharging.

The learned capacity indicates the ratio of the present full charge capacity with respect to the initial full charge capacity of the storage battery 111. For example, the learned capacity may be calculated on the basis of the capacity of the storage battery 111 in the case where a full charge is carried out after the storage battery 111 has been completely discharged. The learned capacity corresponds to the state of health (SOH). Furthermore, the total usage time is the time that has elapsed from when the storage battery 111 was first charged.

A charge and a discharge are taken as one cycle, and the number of charge/discharge cycles is the total number of cycles. In a charge/discharge cycle, one cycle may be defined as simply one instance of charging and one instance of discharging being carried out with respect to the storage battery 111. Alternatively, one cycle may be defined as one instance of charging and one instance of discharging being carried out with one instance of charging being taken as the sum of the amount charged to the storage battery 111 reaching the value for the full charge capacity and one instance of discharging being taken as the sum of the amount discharged from the storage battery 111 reaching the value for the full charge capacity. Alternatively, one instance of charging and discharging may be taken as when the charged amount and the discharged amount reach a predetermined proportion of the full charge capacity. Furthermore, the full charge count is the number of times that the storage battery 111 has reached a fully charged state.

The storage battery capacity is the amount of remaining electricity in the storage battery 111. Furthermore, the total charged/discharged amount may be handled by totaling the total charged amount, which is the total of the amount charged in each charge carried out with respect to the storage battery 111 from the manufacturing day, and the total discharged amount, which is the total of the amount discharged in each discharge carried out with respect to the storage battery 111 from the manufacturing day, or the total charged amount and the total discharged amount of the storage battery 111 may be handled separately.

The charging device 102 is provided with a control device 123, the first communication device 124, a display device 125, a storage device 126, a second communication device 127, and a power source 128. The power source 128 is a constituent element that supplies power to the power storage device 101. Specifically, the power source 128 is an electrical circuit that supplies power from a power system to the power storage device 101. The power source 128 converts alternating-current power from the power system into direct-current power, and sends the direct-current power to the power storage device 101, which is electrically connected to the charging device 102.

The storage device 126 is a constituent element that stores a variety of information. The storage device 126 may be configured from a semiconductor memory or the like, or may be configured from a volatile memory, a nonvolatile memory, or the like. Furthermore, the storage device 126 may be a read-only memory, namely a non-rewritable memory. The storage device 126 stores information relating to the charging device 102. The information relating to the charging device 102 may include identification information such as an identification number of the charging device 102, a product number, or the like.

The first communication device 124 is a constituent element for the charging device 102 to communicate with the power storage device 101 and the like. The first communication device 124 may be a communication circuit including a communication interface. The first communication device 124 communicates with the power storage device 101 and the like in accordance with control implemented by the control device 123. The first communication device 124 is configured so as to communicate with the communication device 114 of the power storage device 101 by means of wired communication or wireless communication, and to transmit and receive information with the communication device 114. In the present embodiment, the first communication device 124 communicates with the communication device 114 by way of short-range wireless communication.

The second communication device 127 is a constituent element for the charging device 102 to communicate with the server device 104 and the like. The second communication device 127 may be a processing circuit including a communication interface. The second communication device 127 communicates with the server device 104 via the router 103 in accordance with control implemented by the control device 123. The second communication device 127 is configured so as to communicate with a first communication device 143 (see FIG. 3) of the server device 104 via the router 103 and a communication network such as the Internet, and to transmit and receive information with the first communication device 143. The second communication device 127 communicates with the router 103 by means of wired communication or wireless communication, and the router 103 is connected to the Internet by way of wired communication or wireless communication. In the present embodiment, the second communication device 127 communicates with the router 103 by way of wireless communication, specifically Wi-Fi (registered trademark), and the router 103 is connected to the Internet by way of wired communication.

The display device 125 is a constituent element that displays information. The display device 125 may be a liquid crystal panel or may be an indicator. The display device 125 may display information in accordance with control implemented by the control device 123. Specifically, the display device 125 may implement a mid-charge display indicating that the power storage device 101 is being charged, display that charging has been completed normally, display that charging has been stopped due to an abnormality, display an instruction sent from the server device 104, display information such as a notification of an abnormality that has occurred in the charging device 102, or the like.

The control device 123 is a constituent element that controls an operation of the charging device 102. For example, the control device 123 may be provided with a converter that controls charging of the power storage device 101, and may control the charging of the power storage device 101 by controlling the supply of power implemented by the power source 128. A device provided with a control function is sufficient for the control device 123, and this may be realized in any manner. For example, the control device 123 may be configured by using dedicated hardware. Furthermore, for example, the control device 123 may be realized by executing a software program suitable for the constituent elements. In this case, the control device 123, for example, may be provided with a computation processing unit (not depicted) and a storage unit (not depicted) that stores a control program. A possible example of the computation processing unit is an MPU, a CPU, or the like. A possible example of the storage unit is a memory or the like. It should be noted that the control device 123 may be constituted by an individual control device that performs centralized control, or may be constituted by a plurality of control devices that cooperate with each other to perform distributed control.

The control device 123 is able to control the first communication device 124, the second communication device 127, the power source 128, and the display device 125, store information in the storage device 126, read information stored in the storage device 126, and the like. Specifically, the control device 123 controls the power source 128 to supply power at a predetermined voltage and current and to stop supplying power, with respect to the power storage device 101 electrically connected to the charging device 102. The control device 123 controls the first communication device 124 to transmit and receive information with the power storage device 101, and controls the second communication device 127 to transmit and receive information with the server device 104. The control device 123 controls the display device 125 to display information.

The charging device 102 and the router 103 may be arranged in a user environment 107. The user environment 107 is a place where charging is carried out. The user environment 107 may be a place where the borrower of the power storage device 101 and the charging device 102 is present for a long period of time such as the house or workplace of the borrower, for example. Charging is carried out in the user environment 107 in the present embodiment, but may be carried out in a place that is different from the user environment 107.

The server device 104 communicates with a billing system 106. The billing system 106 is a constituent element that carries out billing processing. The billing system 106 may be separate from the server device 104 or may be included in the server device 104. The billing system 106 may be an information processing device such as a computer. The billing system 106 may be made up of a plurality of devices. The billing system 106 calculates a fee for the rental of the power storage device 101, for example. More specifically, the billing system 106 adds a charging usage fee to the fee for the rental of the power storage device 101 each time the power storage device 101 is charged using the charging device 102.

Figure 3:
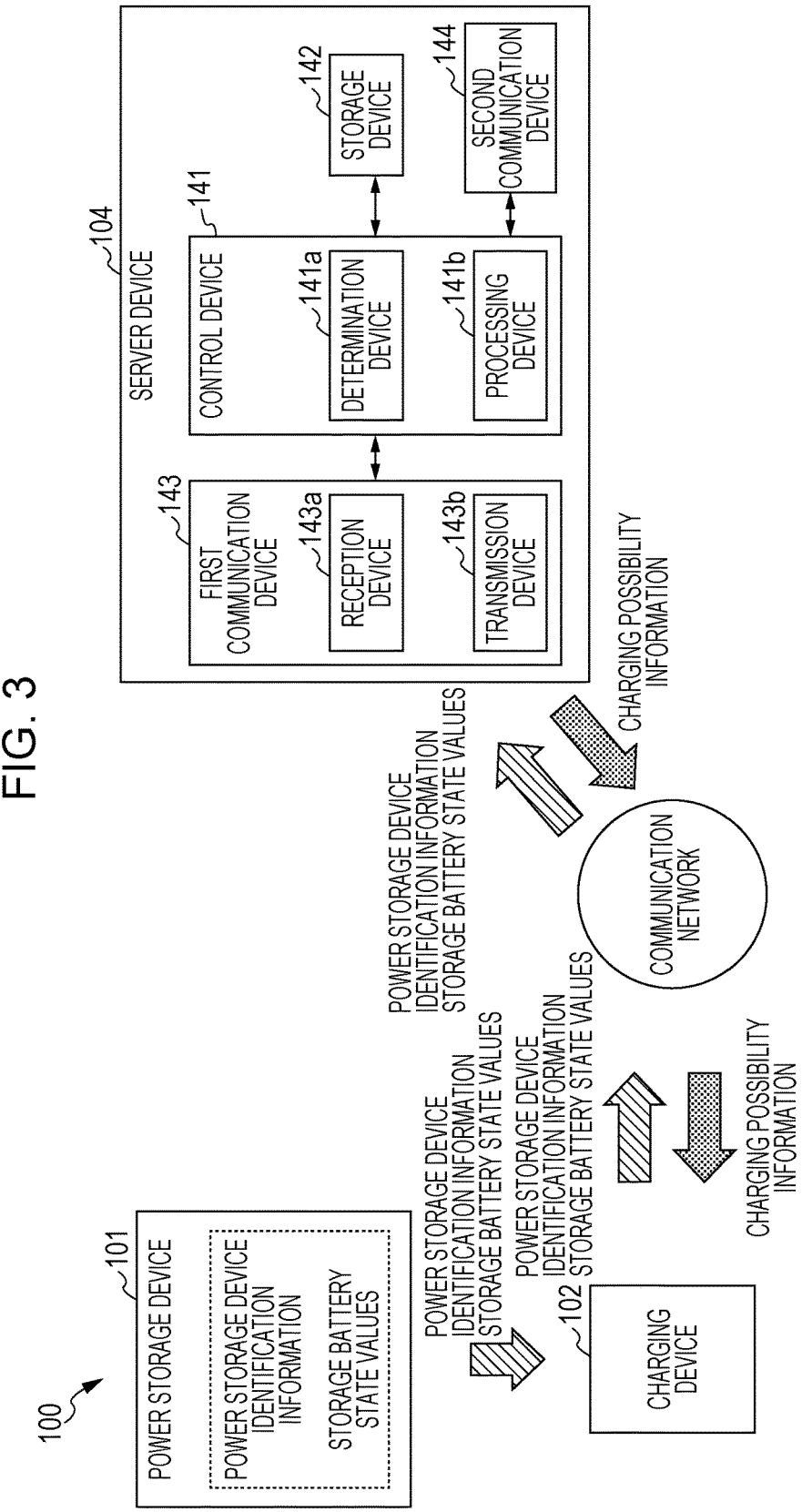
FIG. 3 is a conceptual diagram depicting the transition of data in the charging system including the server device according to the embodiment.

The detailed configuration of the server device 104 will be described with reference to FIGS. 2 and 3. It should be noted that FIG. 3 is a conceptual diagram depicting the transition of data in the charging system 100 including the server device 104. The server device 104 is provided with a control device 141, a storage device 142, the first communication device 143, and a second communication device 144.

The first communication device 143 is a constituent element for the server device 104 to communicate with the charging device 102 and the like. The first communication device 143 may be a processing circuit including a communication interface. The first communication device 143 communicates with the charging device 102 and the like via the router 103 in accordance with control implemented by the control device 141. Specifically, the first communication device 143 connects to the Internet by way of wired communication or wireless communication, and communicates with the second communication device 127 of the charging device 102 via the Internet and the router 103. The first communication device 143 includes a reception device 143a and a transmission device 143b. The reception device 143a is a constituent element for receiving information. The reception device 143a may send received information to the control device 141 or to the storage device 142. The transmission device 143b is a constituent element for transmitting information. The transmission device 143b may be configured so as to receive information from the control device 141 or the storage device 142, and sends received information to the charging device 102 and the like via the router 103.

The second communication device 144 is a constituent element for the server device 104 to communicate with the communication terminal 105 and the like. The second communication device 144 may be a processing circuit including a communication interface. The second communication device 144 communicates with the communication terminal 105 and the like in accordance with control implemented by the control device 141. Specifically, the second communication device 144 is connected to a telephone line of a mobile communication specification such as 3G, 4G, or LTE, and communicates with the communication terminal 105 of the borrower of the power storage device 101 and the charging device 102.

The storage device 142 is a constituent element that stores a variety of information. The storage device 142 may be configured from a semiconductor memory or the like, or may be configured from a volatile memory, a nonvolatile memory, or the like. Furthermore, the storage device 142 may be a read-only memory, namely a non-rewritable memory. The storage device 142 may be incorporated inside the server device 104 or may exist inside a cloud server to which the server device 104 is able to access.

The storage device 142 stores the identification information of the rented power storage device 101. The storage device 142 may store the identification information of the rented power storage device 101 and charging device 102 in association with the combination of the power storage device 101 and charging device 102. In addition, the storage device 142 may also store information relating to the power storage device 101 and the charging device 102. Furthermore, the storage device 142 may store information relating to the borrower of the power storage device 101 and the charging device 102 in association with the identification information of at least one of the power storage device 101 and the charging device 102. Information relating to the communication terminal 105 of the borrower may be included in the information relating to the borrower. Furthermore, the storage device 142 may also store charging implementation history of the power storage device 101 implemented by the borrower using the charging device 102, in association with the identification information of at least one of the power storage device 101 and the charging device 102. Furthermore, the storage device 142 may store information received by the first communication device 143 from the charging device 102, in association with the identification information of at least one of the power storage device 101 and the charging device 102. The storage device 142, for example, when having received information indicating the state of the storage battery 111 of the power storage device 101 via the charging device 102, stores the information as state history data of the storage battery 111.

The control device 141 is a constituent element that controls an operation of the server device 104. A device provided with a control function is sufficient for the control device 141, and this may be realized in any manner. For example, the control device 141 may be configured by using dedicated hardware. Furthermore, for example, the control device 141 may be realized by executing a software program suitable for the constituent elements. In this case, the control device 141, for example, may be provided with a computation processing unit (not depicted) and a storage unit (not depicted) that stores a control program. A possible example of the computation processing unit is an MPU, a CPU, or the like. A possible example of the storage unit is a memory or the like. It should be noted that the control device 141 may be constituted by an individual control device that performs centralized control, or may be constituted by a plurality of control devices that cooperate with each other to perform distributed control.

The control device 141 includes a determination device 141a and a processing device 141b. The determination device 141a is configured so as to be able to receive information from the reception device 143a of the first communication device 143, send information to the transmission device 143b of the first communication device 143, transmit and receive information with the second communication device 144, and store and read information with respect to the storage device 142. The determination device 141a permits or prohibits charging of the power storage device 101 by the charging device 102, that is, determines the possibility of charging, on the basis of information received from the reception device 143a and information in the storage device 142. The determination device 141a sends a determination result regarding the possibility of charging to the transmission device 143b. Thus, the determination result regarding the possibility of charging is transmitted to the charging device 102 and displayed on the display device 125 of the charging device 102. Furthermore, the determination device 141a sends the determination result regarding the possibility of charging to the communication terminal 105 via the second communication device 144. The computation processing unit and storage unit of the control device 141 are used for the determination performed by the determination device 141a. Specifically, a program stored in the storage unit of the control device 141 causes the computation processing unit to execute the determination.

The processing device 141b is configured so as to be able to receive information from the reception device 143a, transmit and receive information with the second communication device 144, transmit and receive information with the billing system 106, and store and read information with respect to the storage device 142. When the power storage device 101 is charged using the charging device 102, the processing device 141b carries out billing processing with respect to the borrower of the power storage device 101 and the charging device 102. In the present embodiment, billing is carried out in which a charging usage fee of a fixed amount is billed each time the power storage device 101 is charged using the charging device 102. When the power storage device 101 is charged using the charging device 102, the processing device 141b transmits a claim notification for the charging usage fee to the billing system 106. The billing system 106 adds the charging usage fee to the fee for the rental of the power storage device 101 of the borrower on the basis of the information received from the processing device 141b. Furthermore, the processing device 141b may be configured so as to transmit information relating to the charging of the power storage device 101 to the communication terminal 105 of the borrower via the second communication device 144.

The transition of data in the charging system 100 will be described with reference to FIG. 3. The power storage device 101 is electrically connected to the charging device 102. The power storage device 101 then transmits power storage device identification information, which is identification information of the power storage device 101, and storage battery state values, which are values indicating the state of the storage battery 111, to the charging device 102. The charging device 102 receives the power storage device identification information and the storage battery state values, and transmits the power storage device identification information and the storage battery state values to the server device 104 via the communication network such as the Internet.

The reception device 143a of the first communication device 143 of the server device 104 receives the power storage device identification information and the storage battery state values. In addition, the determination device 141a of the control device 141 of the server device 104 determines the possibility of charging the power storage device 101, on the basis of the power storage device identification information and the storage battery state values received, and history data for the power storage device identification information and storage battery state values stored in the storage device 142. The transmission device 143b of the first communication device 143 of the server device 104 then transmits charging possibility information to the charging device 102 via the communication network. It should be noted that the details of the determination operation performed by the determination device 141a will be described later on.

Individual identification information of the power storage device 101, design information of the power storage device 101, manufacturing information of the storage battery 111, and the like may be included in the power storage device identification information. The individual identification information of the power storage device 101 is identification information that is uniquely assigned to the power storage device 101, and is identification information for uniquely identifying the power storage device 101 from a plurality of power storage devices. The individual identification information of the power storage device 101 is a serial number assigned to the power storage device 101, for example. The total charge/discharge count, the learned capacity, the internal resistance, the total usage time, the number of charge/discharge cycles, the full charge count, the storage battery capacity, the total charged/discharged amount, or the like of the storage battery 111 may be included in the storage battery state values.

The charging device 102 receives the charging possibility information. The charging device 102 may control the charging of the power storage device 101 in accordance with the received charging possibility information. Alternatively, the charging device 102 may transmit the received charging possibility information to the power storage device 101. The power storage device 101 may then receive the charging possibility information, and control whether or not charging from the charging device 102 is to be received, in accordance with the received charging possibility information.

Figure 4:
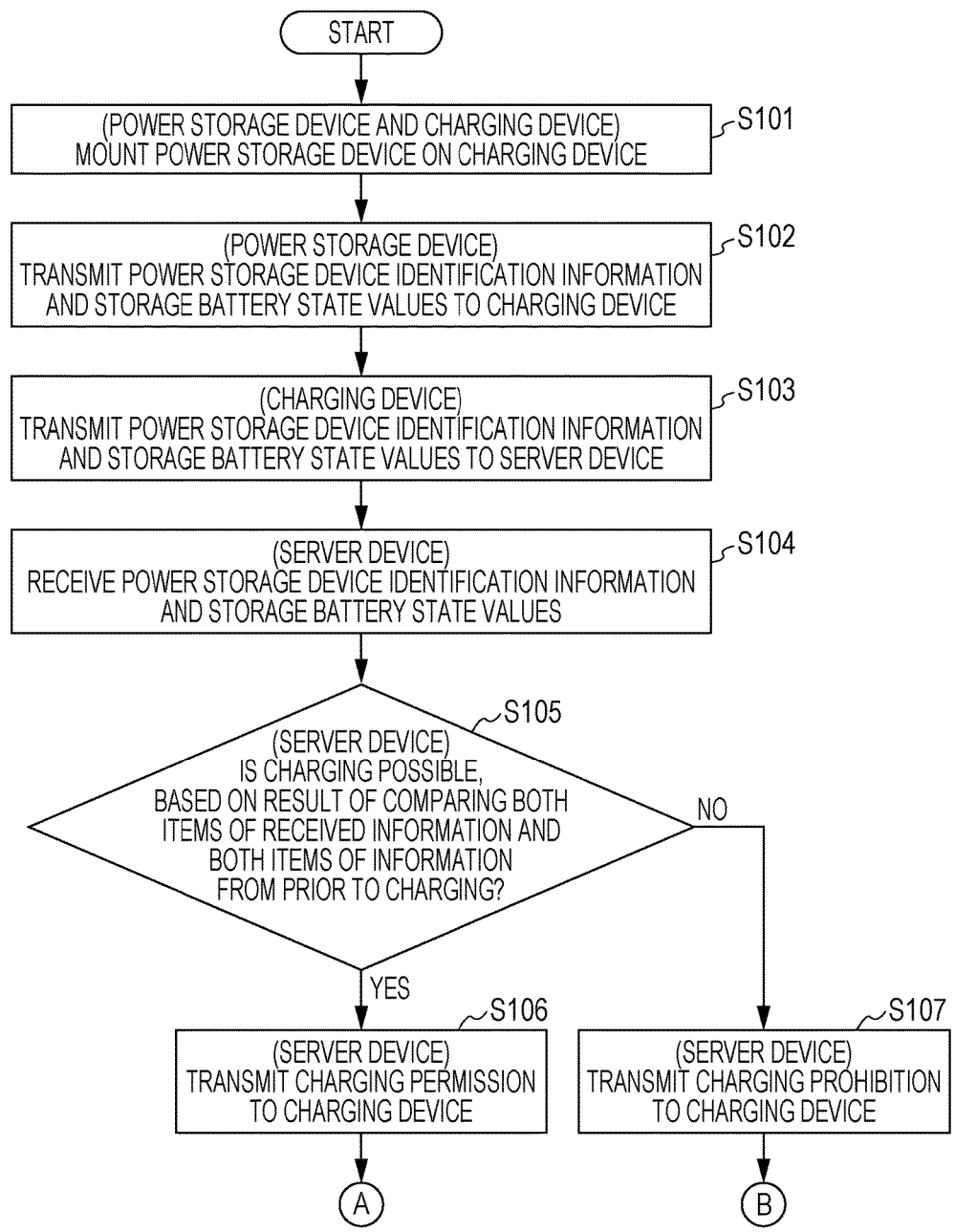
FIG. 4 is a flowchart depicting an operation of the charging system including the server device according to the embodiment.
Figure 5:
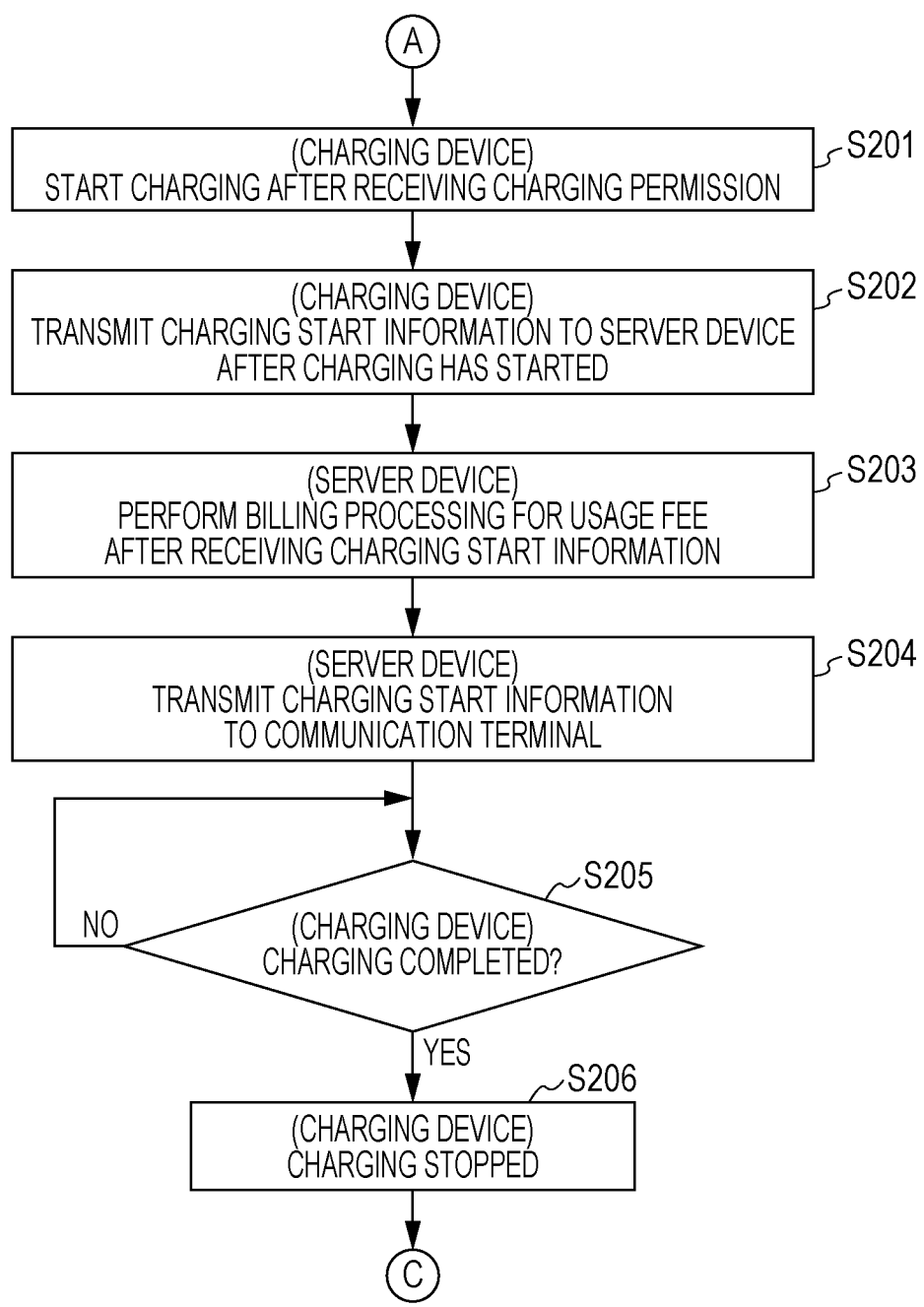
FIG. 5 is a flowchart depicting an operation of the charging system including the server device according to the embodiment.
Figure 6:
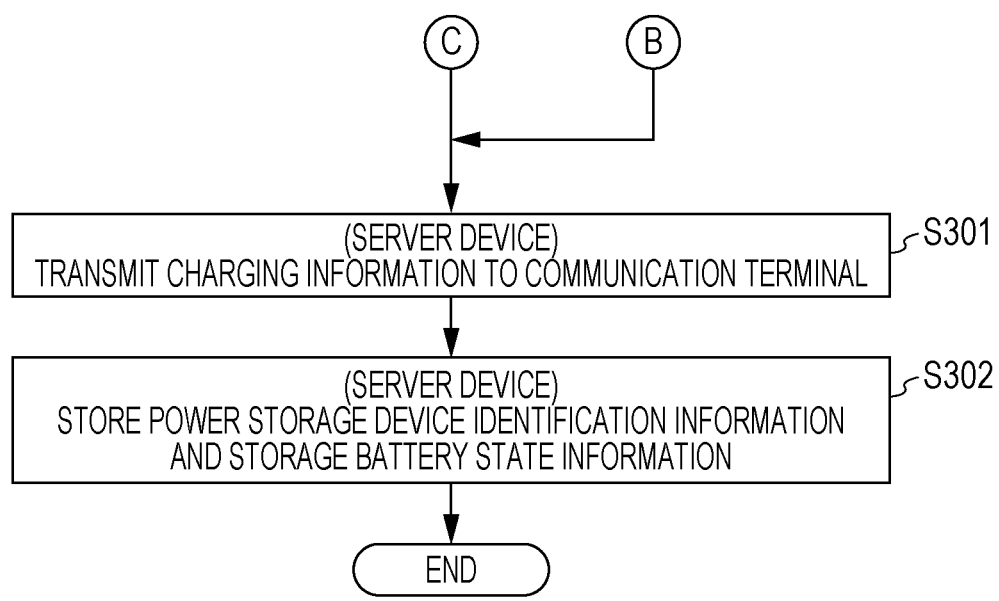
FIG. 6 is a flowchart depicting an operation of the charging system including the server device according to the embodiment.

Next, a detailed operation of the server device 104 and the charging system 100 will be described with reference to FIGS. 2, 3, 4, 5, and 6. It should be noted that FIGS. 4 to 6 are flowcharts depicting an operation of the charging system 100 including the server device 104.

First, the power storage device 101 is mounted on the charging device 102 for the power storage device 101 to be charged (S101). That is, the power storage device 101 is electrically connected to the charging device 102. At such time, the power storage device 101 and the charging device 102 do not start the charging of the power storage device 101 yet, and maintain a charging start waiting state. The power storage device 101 may be electrically connected by being physically connected to the charging device 102, or may be electrically connected by means of a non-contact power supply system by being brought close to the charging device 102.

The control device 113 of the power storage device 101, when having detected an electrical connection between the power storage device 101 and the charging device 102, transmits the power storage device identification information and the storage battery state values to the charging device 102 (S102). Specifically, the control device 113 of the power storage device 101 acquires power storage device identification information from the storage device 116 of the power storage device 101, and transmits the power storage device identification information to the charging device 102. Furthermore, the control device 113 of the power storage device 101 uses a detection result detected by the detection device 112 of the power storage device 101 immediately after the power storage device 101 is electrically connected to the charging device 102, to update the storage battery state values of the storage battery 111 stored in the storage device 116, and transmits the updated storage battery state values to the charging device 102. The charging device 102 receives the power storage device identification information and the storage battery state values transmitted from the power storage device 101. It should be noted that the control device 113 of the power storage device 101 may transmit the storage battery state values of the storage battery 111 stored in the storage device 116 to the charging device 102 without updating the storage battery state values immediately after the power storage device 101 is electrically connected to the charging device 102.

Next, the control device 123 of the charging device 102 transmits the received power storage device identification information and storage battery state values to the server device 104 (S103). At such time, the control device 123 of the charging device 102 may also transmit the identification information of the charging device 102 stored in the storage device 126 to the server device 104.

The control device 141 of the server device 104 receives the power storage device identification information and the storage battery state values (S104). The determination device 141a of the control device 141 of the server device 104 then determines whether to permit or prohibit charging of the power storage device 101, that is, performs a charging possibility determination, on the basis of the received power storage device identification information and storage battery state values (S105). Specifically, the determination device 141a of the server device 104 searches for and acquires power storage device identification information that corresponds to the received power storage device identification information, and state history data of the storage battery 111 of the power storage device 101 that is information associated with the aforementioned power storage device identification information, from among the information already stored in the storage device 142 of the server device 104 prior to receiving the power storage device identification information and the storage battery state values. In addition, the determination device 141a compares the received storage battery state values and the acquired state history data of the storage battery 111, which is data that is older than the aforementioned storage battery state values. For example, the state history data of the storage battery 111 may include data of a neighboring period prior to the new charging brought about by the connection of the power storage device 101 to the charging device 102, and, specifically, may include data from when charging was completed prior to the new charging brought about by the connection of the power storage device 101 to the charging device 102. It should be noted that the determination device 141a may, after the abovementioned comparison has been carried out, perform updating by adding the received storage battery state values to the acquired state history data of the storage battery 111, and store such in the storage device 142. Thus, the determination device 141a stores the state history data of the storage battery 111 from during processing for starting charging, in the storage device 142.

As a result of the comparison, in the case where the received storage battery state values indicate a state of the storage battery that is normal, namely that can be permitted, with respect to the state history data of the storage battery 111, the determination device 141a determines that charging of the power storage device 101 is permitted (yes in S105), and transmits information indicating that charging is permitted to the charging device 102 (S106). The control device 123 of the charging device 102 then starts charging the power storage device 101 after receiving the information indicating that charging is permitted from the server device 104 (S201 in FIG. 5). It should be noted that the determination device 141a may transmit the information indicating that charging is permitted to the communication terminal 105 of the borrower of the power storage device 101. A configuration may be implemented in which the borrower then inputs a key such as a password which indicates that charging is permitted and is displayed on the communication terminal 105, to the power storage device 101 or the charging device 102, and charging is thereby started.

However, in the case where the received storage battery state values indicate a state of the storage battery that is not normal, namely that cannot be permitted, with respect to the state history data of the storage battery 111, the determination device 141a determines that charging of the power storage device 101 is prohibited (no in S105), and transmits charging information including information indicating that charging is prohibited to the communication terminal 105 of the borrower of the power storage device 101 (S301 in FIG. 6). The borrower is thereby notified that the charging of the power storage device 101 cannot be started. It should be noted that the power storage device 101 and the charging device 102 may be configured so that charging is not started unless information indicating that charging is permitted is received.

Furthermore, the determination device 141a, when having determined that charging of the power storage device 101 is prohibited (no in S105), may also transmit information indicating that charging is prohibited to the charging device 102 (S107). At such time, the control device 123 of the charging device 102 that has received the information indicating that charging is prohibited does not carry out charging. In addition, the control device 123 may implement a display indicating that charging is not possible on the display device 125 of the charging device 102. It should be noted that, with regard to charging by the charging device 102 not being carried out, the control device 113 of the power storage device 101 that has received information indicating that charging is prohibited via the charging device 102 may carry out control in such a way that charging is not accepted. It should be noted that the transmission destination for the information indicating that charging is prohibited may be either the charging device 102 or the communication terminal 105.

The total charge/discharge count, the learned capacity, the internal resistance, the total usage time, the number of charge/discharge cycles, the full charge count, the storage battery capacity, the total charged/discharged amount, and the like of the storage battery 111 may be included in the storage battery state values. The calculation of the values of all of the abovementioned parameters may be carried out by the control device 113 of the power storage device 101, or the calculation of at least some of the values of the abovementioned parameters may be carried out by the control device 141 of the server device 104.

The history data of each of the total charge/discharge count, the learned capacity, the internal resistance, the total usage time, the number of charge/discharge cycles, the full charge count, the storage battery capacity, and the total charged/discharged amount of the storage battery 111 also includes data regarding the time at which new data has been added and the history data has been updated due to charging being carried out and so forth. The storage device 142 may store the history data of the parameters as time-sequential data along a time axis, by means of a map or the like, or may store the history data of the parameters as data that changes along an axis for the number of times that events caused by phenomena such as charging and discharging occur, by means of a map or the like.

The history data of the total charge/discharge count may be data that is stored in the server device 104 as time elapses, or may be data that is stored in the server device 104 as the event count thereof increases. The total charge/discharge count exhibits a tendency to increase together with use by the borrower, and to increase over time as history data. The amount of change in the total charge/discharge count exhibits a tendency to increase as deterioration of the storage battery 111 progresses. When the deterioration of the storage battery 111 progresses to near the usage limit or an abnormality occurs in the storage battery 111, the capacity of the storage battery 111 rapidly decreases, and the charging and discharging frequency rapidly increases. The determination device 141a of the server device 104 compares the total charge/discharge count included in the storage battery state values acquired from the storage device 116 of the power storage device 101 prior to the power storage device 101 being connected to the charging device 102 and charging being newly started, and the history data of a past total charge/discharge count stored in the server device 104. The history data of the past total charge/discharge count is exemplified by the data of a total charge/discharge count stored in the server device 104 when the power storage device 101 has been charged in a neighboring period (the previous time, for example) prior to the new charging. Furthermore, the data of the total charge/discharge count acquired from the storage device 116 of the power storage device 101 when the new charging is carried out is added to the history data of the server device 104 as new data. In the abovementioned comparison, the amount of change in the total charge/discharge count is determined. When the new charging is started, if the amount of change from the past history data for the total charge/discharge count acquired prior to the charging being started is equal to or greater than a first threshold value, the determination device 141a deems that an abnormality or deterioration of a level at which the storage battery 111 cannot be charged has occurred, and prohibits charging of the storage battery 111. Here, the abovementioned first threshold value is set as a value that is greater than an upper limit value for the amount of change in the total charge/discharge count at which it is possible to determine that charging can be carried out.

The history data of the learned capacity may be data that is stored in the server device 104 as time elapses, or may be data that is stored in the server device 104 as the event count thereof increases. The learned capacity exhibits a tendency to decrease together with the elapse of time and an increase in the event count thereof. When the deterioration of the storage battery 111 progresses to near the usage limit or an abnormality occurs in the storage battery 111, the learned capacity rapidly decreases. The determination device 141a of the server device 104 compares the learned capacity included in the storage battery state values acquired from the storage device 116 of the power storage device 101 prior to new charging being started after the connection of the power storage device 101 to the charging device 102, and the history data of a past learned capacity stored in the server device 104. The history data of the past learned capacity is exemplified by the data of a learned capacity stored in the server device 104 when the power storage device 101 has been charged in a neighboring period (the previous time, for example) prior to the new charging. Furthermore, the data of the learned capacity acquired from the storage device 116 of the power storage device 101 when the new charging is carried out is added to the history data of the server device 104 as new data. In the abovementioned comparison, the amount of change in the learned capacity is determined. When the new charging is started, if the amount of change from the past history data for the learned capacity acquired prior to the charging being started is equal to or greater than a second threshold value, the determination device 141a deems that an abnormality or deterioration of a level at which the storage battery 111 cannot be charged has occurred, and prohibits charging of the storage battery 111. Here, the abovementioned second threshold value is set as a value that is greater than an upper limit value for the amount of change in the learned capacity at which it is possible to determine that charging can be carried out.

The history data of the internal resistance may be data that is stored in the server device 104 as time elapses, or may be data that is stored in the server device 104 as the event count thereof increases. The internal resistance exhibits a tendency to increase together with the elapse of time and an increase in the event count thereof. When the deterioration of the storage battery 111 progresses to near the usage limit or an abnormality occurs in the storage battery 111, the internal resistance rapidly increases. The determination device 141a of the server device 104 compares the internal resistance included in the storage battery state values acquired from the storage device 116 of the power storage device 101 prior to new charging being started after the connection of the power storage device 101 to the charging device 102, and the history data of a past internal resistance stored in the server device 104. The history data of the past internal resistance is exemplified by the data of an internal resistance stored in the server device 104 when the power storage device 101 has been charged in a neighboring period (the previous time, for example) prior to the new charging. Furthermore, the data of the internal resistance acquired from the storage device 116 of the power storage device 101 when the new charging is carried out is added to the history data of the server device 104 as new data. In the abovementioned comparison, the amount of change in the internal resistance is determined.

When the new charging is started, if the amount of change from the past history data for the internal resistance acquired prior to the charging being started is equal to or greater than a third threshold value, the determination device 141a deems that an abnormality or deterioration of a level at which the storage battery 111 cannot be charged has occurred, and prohibits charging of the storage battery 111. Here, the abovementioned third threshold value is set as a value that is greater than an upper limit value for the amount of change in the internal resistance at which it is possible to determine that charging can be carried out.

The history data of the total usage time may be data that is stored in the server device 104 as time elapses, or may be data that is stored in the server device 104 as the event count thereof increases. The total usage time exhibits a tendency to increase together with use by the borrower, and to increase over time as history data. The determination device 141a of the server device 104 compares the total usage time included in the storage battery state values acquired from the storage device 116 of the power storage device 101 prior to new charging being started after the connection of the power storage device 101 to the charging device 102, and the history data of a past total usage time stored in the server device 104. The history data of the past total usage time is exemplified by the data of a total usage time stored in the server device 104 when the power storage device 101 has been charged in a neighboring period (the previous time, for example) prior to the new charging. Furthermore, the data of the total usage time acquired from the storage device 116 of the power storage device 101 when the new charging is carried out is added to the history data of the server device 104 as new data. In the abovementioned comparison, the amount of change in the total usage time is determined. When the new charging is started, if the amount of change from the past history data for the total usage time acquired prior to the charging being started is equal to or greater than a fourth threshold value, the determination device 141a deems that an abnormality or deterioration of a level at which the storage battery 111 cannot be charged has occurred, and prohibits charging of the storage battery 111. This is because there is an upper limit for the amount of change in the total usage time between when the new charging is started and a neighboring period (when the previous charging was carried out, for example), and there is a high possibility of an abnormality occurring in the storage battery 111 if this upper limit is exceeded. The abovementioned fourth threshold value is therefore set as a value that is greater than the upper limit value for the amount of change in the total usage time at which it is possible to determine that charging can be carried out.

The history data of the number of charge/discharge cycles may be data that is stored in the server device 104 as time elapses, or may be data that is stored in the server device 104 as the event count thereof increases. When the deterioration of the storage battery 111 progresses to near the usage limit or an abnormality occurs in the storage battery 111, the number of charge/discharge cycles rapidly increases. The determination device 141a of the server device 104 compares the number of charge/discharge cycles included in the storage battery state values acquired from the storage device 116 of the power storage device 101 prior to new charging being started after the connection of the power storage device 101 to the charging device 102, and the history data of a past number of charge/discharge cycles stored in the server device 104. The history data of the past number of charge/discharge cycles is exemplified by the data of the number of charge/discharge cycles stored in the server device 104 when the power storage device 101 has been charged in a neighboring period (the previous time, for example) prior to the new charging. Furthermore, the data of the number of charge/discharge cycles acquired from the storage device 116 of the power storage device 101 when the new charging is carried out is added to the history data of the server device 104 as new data. In the abovementioned comparison, the amount of change in the number of charge/discharge cycles is determined. When the new charging is started, if the amount of change from the past history data for the number of charge/discharge cycles acquired prior to the charging being started is equal to or greater than a fifth threshold value, the determination device 141*a* deems that an abnormality or deterioration of a level at which the storage battery 111 cannot be charged has occurred, and prohibits charging of the storage battery 111. This is because there is an upper limit for the amount of change in the number of charge/discharge cycles between when the new charging is started and a neighboring period (when the previous charging was carried out, for example), and there is a high possibility of an abnormality occurring in the storage battery 111 if this upper limit is exceeded. Here, the abovementioned fifth threshold value is set as a value that is greater than the upper limit value for the amount of change in the number of charge/discharge cycles at which it is possible to determine that charging can be carried out.

The history data of the full charge count may be data that is stored in the server device 104 as time elapses, or may be data that is stored in the server device 104 as the event count thereof increases. When the deterioration of the storage battery 111 progresses to near the usage limit or an abnormality occurs in the storage battery 111, the full charge count rapidly increases. The determination device 141*a* of the server device 104 compares the full charge count included in the storage battery state values acquired from the storage device 116 of the power storage device 101 prior to new charging being started after the connection of the power storage device 101 to the charging device 102, and the history data of a past full charge count stored in the server device 104. The history data of the past full charge count is exemplified by the data of a full charge count stored in the server device 104 when the power storage device 101 has been charged in a neighboring period (the previous time, for example) prior to the new charging. Furthermore, the data of the full charge count acquired from the storage device 116 of the power storage device 101 when the new charging is carried out is added to the history data of the server device 104 as new data. In the abovementioned comparison, the amount of change in the full charge count is determined. When the new charging is started, if the amount of change from the past history data for the full charge count acquired prior to the charging being started is equal to or greater than a sixth threshold value, the determination device 141*a* deems that an abnormality or deterioration of a level at which the storage battery 111 cannot be charged has occurred, and prohibits charging of the storage battery 111. This is because there is an upper limit for the amount of change in the full charge count between when the new charging is started and a neighboring period (when the previous charging was carried out, for example), and there is a high possibility of an abnormality occurring in the storage battery 111 if this upper limit is exceeded. Here, the abovementioned sixth threshold value is set as a value that is greater than the upper limit value for the amount of change in the full charge count at which it is possible to determine that charging can be carried out.

The determination of the possibility of charging the storage battery 111 using values indicating the state of the storage battery 111 such as the total charge/discharge count, the learned capacity, the internal resistance, the total usage time, the number of charge/discharge cycles, and the full charge count of the storage battery 111 is a determination that is based upon whether or not an abnormality or deterioration has occurred in the storage battery 111. Thus, according to the abovementioned determination of the possibility of charging, continued use of the storage battery 111 in which an abnormality or deterioration has occurred is suppressed. The threshold values used in the abovementioned determination of the possibility of charging may be altered according to the degree to which the deterioration of the storage battery 111 has progressed. In the abovementioned determination of the possibility of charging, the difference between a value indicating the state of the storage battery 111 acquired by the server device 104 prior to the start of charging when new charging is to be started, and a value indicating the state of the storage battery 111 stored in the server device 104 when the storage battery 111 has been charged in a neighboring period (the previous time, for example) prior to the new charging, is the element that is to be determined.

The history data of the storage battery capacity, namely the amount of remaining electricity of the storage battery, may be data that is stored in the server device 104 as time elapses, or may be data that is stored in the server device 104 as the event count thereof increases. The determination device 141*a* of the server device 104 compares new data of the storage battery capacity acquired prior to the start of charging when new charging is to be started, namely the storage battery capacity from immediately prior to the start of charging, and history data of a storage battery capacity of a neighboring period (when charging was completed the previous time, for example) prior to the new charging, stored in the storage device 142. When the difference between the new data and the history data is equal to or less than a seventh threshold value, the determination device 141*a* prohibits charging of the storage battery 111. Thus, repeated charging and discharging at a high frequency due to charging being carried out with small amounts of discharge is suppressed. Here, the seventh threshold value is set appropriately in order to suppress repeated charging and discharging at a high frequency.

The history data of the total charge/discharge count may be data that is stored in the server device 104 as time elapses, or may be data that is stored in the server device 104 as the event count thereof increases. The determination device 141*a* of the server device 104 compares new data for the total charge/discharge count acquired prior to the start of charging when new charging is to be started, and history data for the total charge/discharge count of a neighboring period (when charging was carried out the previous time, for example) prior to the new charging, stored in the storage device 142. When the difference between the new data and the history data is equal to or less than an eighth threshold value, the determination device 141*a* prohibits charging of the storage battery 111. For the total charge/discharge count, the storage battery 111 being charged to the full charge capacity is counted as one instance of charging, and the remaining capacity of the storage battery 111 being discharged to a usage lower limit value is counted as one instance of discharging. The usage lower limit value refers to a lower limit value for the capacity of the storage battery 111 with which an electrical device is able to use the power of the storage battery 111. The voltage of the storage battery 111 when this capacity lower limit value is reached is higher than the discharge end voltage. Here, if the difference between total charge/discharge counts is small, the storage battery 111 is charged in an insufficiently discharged state, and repeated charging and discharging at a high frequency is carried out; however, this is suppressed by the abovementioned control. It should be noted that the abovementioned eighth threshold value is set as a value that is less than the abovementioned first threshold value.

The history data for the total charged/discharged amount may be data that is stored in the server device 104 as time elapses, or may be data that is stored in the server device 104 as the event count thereof increases. The determination device 141a of the server device 104 compares new data for the total charged/discharged amount acquired prior to the start of charging when new charging is to be started, and history data for the total charged/discharged amount of a neighboring period (when charging was carried out the previous time, for example) prior to the new charging, stored in the storage device 142. When the difference between the new data and the history data is equal to or less than a ninth threshold value, the determination device 141a prohibits charging of the storage battery 111. Here, if the difference between total charged/discharged amounts is small, the storage battery 111 is charged in an insufficiently discharged state, and repeated charging and discharging at a high frequency is carried out; however, this is suppressed by the abovementioned control.

The determination of the possibility of charging the storage battery 111 using values indicating the state of the storage battery 111 such as the storage battery capacity, the total charge/discharge count, and the total charged/discharged amount of the storage battery 111 is a determination that is based upon whether or not the new charging corresponds to repeated charging in an insufficient discharged state constituting a cause for deterioration of the storage battery 111. According to the abovementioned determination of the possibility of charging, progression of the deterioration of the storage battery 111 is suppressed. The threshold values used in the abovementioned determination of the possibility of charging may be altered according to the degree to which the deterioration of the storage battery 111 has progressed.

The control device 123 of the charging device 102, after having started charging of the power storage device 101 (S201), transmits charging start information indicating that charging has been started to the server device 104 (S202).

After the charging start information is received, the processing device 141b of the control device 141 of the server device 104 carries out billing processing for a charging usage fee (S203). For example, in the case where the server device 104 includes the billing system 106, the processing device 141b of the server device 104 adds a charging usage fee for the power storage device 101 to a fee for renting the power storage device 101. In the case where the server device 104 does not include the billing system 106, the processing device 141b may notify the start of charging or the execution of billing to an external billing system 106. In addition, the processing device 141b of the control device 141 of the server device 104 transmits charging start information to the communication terminal 105 of the borrower of the power storage device 101 (S204).

Next, the control device 123 of the charging device 102 determines whether or not the charging has been completed (S205). The control device 123 then repeatedly determines whether or not the charging has been completed, until the charging has been completed, and stops the charging if the charging has been completed (S206). It should be noted that the control device 123 stops the charging also in the case where it has been detected that there is an abnormality in the power storage device 101 such as an abnormal increase in the voltage of the power storage device 101, an abnormal increase in the current of the power storage device 101, an abnormal increase in the temperature of the power storage device 101, or the like. The control device 123 stops the charging also in the case where the power storage device 101 is detached from the charging device 102. The abovementioned determination regarding the completion of charging may be carried out by the control device 113 of the power storage device 101. At such time, if the charging has been completed, the control device 113 of the power storage device 101 may stop accepting the supply of power from the charging device 102, or instruct the charging device 102 to stop charging.

Next, the processing device 141b of the control device 141 of the server device 104 transmits charging information, which is information relating to the charging of the power storage device 101 (a charging result), to the communication terminal 105 (S301). In the present example, information indicating that charging is permitted or information indicating that charging is prohibited is included in the charging information. It should be noted that an example is permissible in which the server device 104 transmits information indicating that charging is prohibited to the communication terminal 105 only in the case where charging has been prohibited, where the charging information includes information indicating that charging is prohibited and does not include information indicating that charging is permitted. That is, it is desirable for the charging information to include at least information indicating that charging is prohibited. Furthermore, the charging information may include normal charging termination information indicating that charging of the power storage device 101 has terminated normally, abnormal charging termination information indicating that charging of the power storage device 101 has terminated abnormally, a charging start time, a charging termination time, information indicating the state of the storage battery 111 of the power storage device 101, and the like.

Next, the processing device 141b of the server device 104 stores storage battery state information of the storage battery 111 including the charging information in the storage device 142 in association with the power storage device identification information of the power storage device 101 (S302). The processing device 141b uses the storage battery state information including the charging information to update the state history data of the storage battery 111 stored in the storage device 142. The storage battery state information including the charging information may be charging information exemplified above such as information indicating that charging is permitted or charging is prohibited, information indicating the non-implementation of charging due to the prohibiting of charging, information indicating the implementation of charging due to the normal termination of charging, information indicating the time and charged amount thereof, information indicating the implementation of charging due to the abnormal termination of charging, information indicating the time and charged amount thereof, other information indicating the state of the storage battery 111 during charging and when charging has been completed, or the like.

In the abovementioned series of operations, charging is not carried out in the case where an abnormality or deterioration exceeding that permitted has occurred in the storage battery 111 of the power storage device 101, or there is a possibility that charging may accelerate the deterioration of the storage battery 111. Thus, deterioration and damage of the storage battery 111 such as the abovementioned are suppressed. In addition, a sufficient charged amount and discharged amount are not obtained even though charging is carried out for a storage battery 111 such as the abovementioned, and therefore the occurrence of inappropriate billing for the borrower due to such a storage battery 111 being charged is suppressed.

As mentioned above, the server device 104 according to the present embodiment is provided with the reception device 143a, the storage device 142, the determination device 141a, and the transmission device 143b. The reception device 143a receives the identification information of the power storage device 101 connected to the charging device 102, and values indicating the state of the storage battery 111 included in the power storage device 101, from the charging device 102. The connection between the power storage device 101 and the charging device 102 includes an electrical connection, which may be implemented by way of a physical connection or may be implemented by way of a wireless connection. The storage device 142 associates and stores the identification information of the power storage device 101 and the history of the values indicating the state of the storage battery 111. The determination device 141a compares the values indicating the state of the storage battery 111 received by the reception device 143a, and past information indicating the state of the storage battery 111 corresponding to the identification information of the power storage device 101 received by the reception device 143a and stored in the storage device 142, to determine the possibility of charging the power storage device 101. The transmission device 143b transmits information indicating the possibility of charging the power storage device 101 determined by the determination device 141a to the charging device 102.

In the abovementioned configuration, the server device 104 determines whether the state of the storage battery 111 of the power storage device 101 is appropriate or inappropriate for charging from the values indicating the state of the storage battery 111 and the past information indicating the state of the storage battery 111. Thus, inappropriate charging of the storage battery 111 may be suppressed.

In the server device 104 according to the present embodiment, prior to charging of the power storage device 101 by the charging device 102 being started, when a value indicating the state of the storage battery 111 received by the charging device 102 has changed by less than a threshold value compared to a value indicating the past state of the storage battery 111, the determination device 141a may determine that it is possible to charge the power storage device 101, and, prior to charging of the power storage device 101 by the charging device 102 being started, when the value indicating the state of the storage battery 111 received by the charging device 102 has changed by equal to or greater than the threshold value compared to the value indicating the past state of the storage battery 111, the determination device 141a may determine that it is not possible to charge the power storage device 101.

In the abovementioned configuration, the possibility of charging the power storage device 101 is determined prior to the charging of the power storage device 101 being started. When the amount of change in the value indicating the state of the storage battery 111 received by the charging device 102 with respect to the value indicating the past state of the storage battery 111 is equal to or greater than the threshold value, charging the power storage device 101 is determined as not being possible. For example, if the abovementioned value indicating the state of the storage battery 111 is taken as a parameter serving as a determination basis for deterioration of the storage battery 111 or whether or not there is an abnormality or the like, namely a parameter relating to the soundness of the storage battery 111, in the case where the abovementioned amount of change in the value indicating the state of the storage battery 111 becomes equal to or greater than the threshold value, it can be deemed that the storage battery 111 is in an unsound state. Thus, charging of the storage battery 111 in an unsound state is suppressed.

On the other hand, in the server device 104 according to the present embodiment, prior to charging of the power storage device 101 by the charging device 102 being started, when a value indicating the state of the storage battery 111 received by the charging device 102 has changed by equal to or greater than a threshold value compared to a value indicating the past state of the storage battery 111, the determination device 141a may determine that it is possible to charge the power storage device 101, and, prior to charging of the power storage device 101 by the charging device 102 being started, when the value indicating the state of the storage battery 111 received by the charging device 102 has changed by less than the threshold value compared to the value indicating the past state of the storage battery 111, the determination device 141a may determine that it is not possible to charge the power storage device 101.

In addition, prior to charging of the power storage device 101 by the charging device 102 being started, the value indicating the state of the storage battery 111 received by the charging device 102 may be the capacity of the storage battery 111 from prior to charging of the power storage device 101 by the charging device 102 being started, and the value indicating the past state of the storage battery 111 may be the capacity from when charging of the storage battery 111 has been completed in the past.

In the abovementioned configuration, the possibility of charging the power storage device 101 is determined prior to the charging of the power storage device 101 being started. When the amount of change in the value indicating the state of the storage battery 111 received by the charging device 102 with respect to the value indicating the past state of the storage battery 111 is less than the threshold value, charging the power storage device 101 is determined as not being possible. For example, when the abovementioned value indicating the state of the storage battery 111 is taken as a parameter serving as a determination basis for whether new charging constitutes a cause for deterioration of the storage battery 111, namely a parameter relating to the charged state of the storage battery 111, such as the capacity of the storage battery 111, if the abovementioned amount of change in the value indicating the state of the storage battery 111 is less than the threshold value, there are cases where the storage battery 111 is charged not in a completely discharged state or even a state near thereto but in a state in which the discharged amount is a small amount. Thus, repeated charging and discharging of the storage battery 111 at small amounts is suppressed, and progression of the deterioration of the storage battery 111 is thereby suppressed.

Furthermore, in the abovementioned description, the information indicating the possibility of charging is information indicating that charging is possible or charging is not possible. Consequently, the information indicating the possibility of charging may be information indicating that charging is possible or may be information indicating that charging is not possible. Furthermore, the possibility of charging may mean permission for charging. That is, charging being possible may mean that charging is permitted, and charging not being possible may mean that charging is prohibited.

As mentioned above, the management of a power storage device based upon the state of a storage battery of the power storage device becomes possible by means of the server device and the like in the present disclosure.

It should be noted that, in the abovementioned embodiment, the constituent elements may be configured by using dedicated hardware, or may be realized by executing a software program suitable for the constituent elements. The constituent elements may be realized by a program execution device such as a CPU or a processor reading out and executing a software program recorded in a recording medium such as a hard disk or a semiconductor memory. Here, software that realizes the server device and the like of the abovementioned embodiment is a program such as the following.

In other words, this program causes a computer to execute: (a) receiving identification information of a power storage device that is connected to a charging device, and a value indicating the state of a storage battery included in the power storage device, from at least one of the charging device and the power storage device; (b) associating and storing the identification information of the power storage device and the value indicating the state of the storage battery; (c) prior to charging of the power storage device by the charging device being started, comparing the value indicating the state of the storage battery received by at least one of the charging device and the power storage device, and a value indicating a past state of the storage battery that is stored and corresponds to the identification information of the power storage device received by at least one of the charging device and the power storage device, and determining the possibility of charging the power storage device; and (d) transmitting information indicating the determined possibility of charging the power storage device to at least one of the charging device and the power storage device.

Furthermore, in the abovementioned embodiment, the constituent elements may be circuits. The plurality of constituent elements may constitute one circuit in their entirety or may constitute separate circuits. Furthermore, the circuits may be general-purpose circuits or may be dedicated circuits.

Other Modified Examples

Hereinabove, a server device and the like according to one or more aspects has been described on the basis of an embodiment as an exemplification of the technology disclosed in the present disclosure. However, the technology in the present disclosure is not restricted to this embodiment and can also be applied to a modified example of the embodiment or another embodiment in which an alteration, substitution, addition, omission or the like has been implemented as appropriate. Modes in which various modifications conceived by a person skilled in the art have been implemented in the present embodiment, and modes constructed by combining the constituent elements in a different embodiment may also be included within the scope of one or more aspects provided they do not depart from the purpose of the present disclosure.

Figure 7:
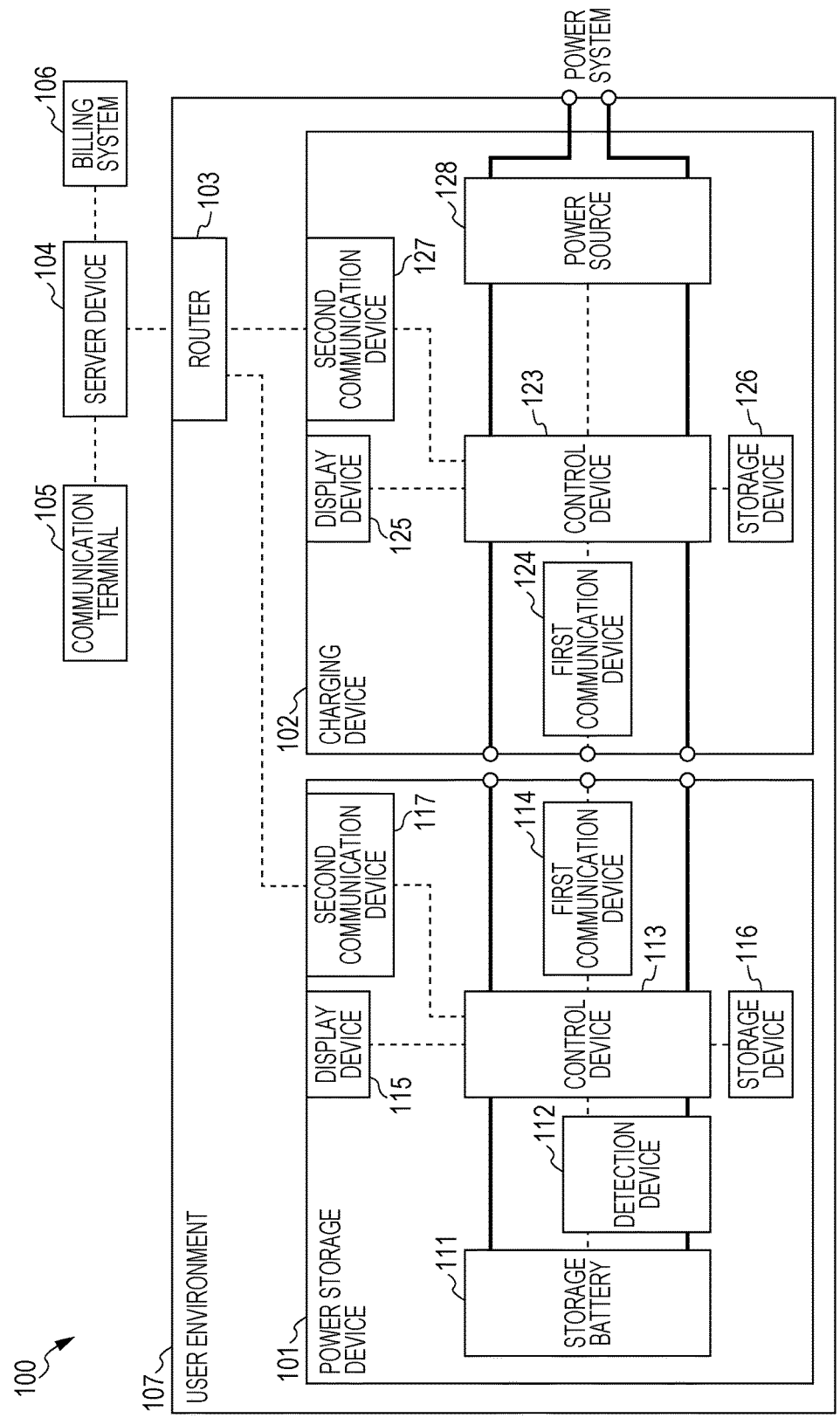
FIG. 7 is a block diagram depicting a configuration of a modified example of the charging system including the server device according to the embodiment.

In the charging system 100 including the server device 104 according to the embodiment, the power storage device 101 is configured in such a way as to not communicate with the server device 104; however, the present disclosure is not restricted thereto. As depicted in FIG. 7, the power storage device 101 may be provided with the communication device 114 serving as a first communication device for communicating with the charging device 102 and the like, and a second communication device 117 for communicating with the server device 104 and the like. The second communication device 117 may have the same configuration as the second communication device 127 of the charging device 102. The power storage device 101 may then connect to a communication network such as the Internet via the second communication device 117 and the router 103, and communicate with the server device 104 via the communication network. At such time, the charging device 102 may or may not be provided with the second communication device 127.

In the case where the power storage device 101 and the charging device 102 are able to communicate with the server device 104, all of the transmitting and receiving carried out between the charging device 102 and the server device 104 in the embodiment may be carried out by the power storage device 101, may be carried out by the charging device 102, or may be carried out by both the power storage device 101 and the charging device 102. Alternatively, some of the transmitting and receiving carried out between the charging device 102 and the server device 104 in the embodiment may be carried out by the power storage device 101 with the rest of the transmitting and receiving being carried out by the charging device 102. In the case where only the power storage device 101 is able to communicate with the server device 104, all of the transmitting and receiving carried out between the charging device 102 and the server device 104 in the embodiment may be carried out by the power storage device 101.

In the charging system 100 including the server device 104 according to the embodiment, the power storage device 101 and the charging device 102 are rented to the same borrower as a set; however, the power storage device 101 and the charging device 102 may be rented to separate borrowers. In this case, a configuration may be implemented in such a way that the charging usage fee is billed to either the borrower of the power storage device 101 or the borrower of the charging device 102.

For example, in the abovementioned embodiment, processing executed by a specific constituent element may be executed by another constituent element instead of the specific constituent element. Furthermore, the order of a plurality of processing may be altered, and a plurality of processing may be executed in parallel.

The present disclosure is able to be used for a server device or the like that determines the possibility of charging a power storage device, and is able to be applied to a power storage device charging system, a power storage device rental system, a power storage device management system, a billing system, or the like.

What is claimed is:
1. A method comprising:
(a) receiving, by a receiver, identification information of a power storage device that is connected to a charging device, and a value indicating a state of a storage battery included in the power storage device, from at least one of the charging device and the power storage device;
(b) associating, by a storage, to each other and storing the identification information of the power storage device and the value indicating the state of the storage battery;
(c) prior to charging of the power storage device by the charging device being started, determining, by a determiner, a possibility of charging the power storage device by comparing the value indicating the state of the storage battery received from at least one of the charging device and the power storage device with a value indicating a past state of the storage battery that is stored and corresponds to the identification information of the power storage device received from at least one of the charging device and the power storage device; and (d) transmitting by a transmitter, information indicating the determined possibility of charging the power storage device to at least one of the charging device and the power storage device; and (e) permitting charging the power storage device by the charging device when charging the power storage device is determined as being possible, and prohibiting charging the power storage device by the charging device when charging the power storage device is determined as not being possible.

2. The method according to claim 1, wherein, in (c), prior to charging of the power storage device by the charging device being started, when the value indicating the state of the storage battery received by at least one of the charging device and the power storage device has changed by less than a threshold value compared to the value indicating the past state of the storage battery, charging the power storage device is determined as being possible, and prior to charging of the power storage device by the charging device being started, when the value indicating the state of the storage battery received by at least one of the charging device and the power storage device has changed by equal to or greater than the threshold value compared to the value indicating the past state of the storage battery, charging the power storage device is determined as not being possible.

3. The method according to claim 1, wherein, in (c), prior to charging of the power storage device by the charging device being started, when the value indicating the state of the storage battery received by at least one of the charging device and the power storage device has changed by equal to or greater than a threshold value compared to the value indicating the past state of the storage battery, charging the power storage device is determined as being possible, and prior to charging of the power storage device by the charging device being started, when the value indicating the state of the storage battery received by at least one of the charging device and the power storage device has changed by less than the threshold value compared to the value indicating the past state of the storage battery, charging the power storage device is determined as not being possible.

4. The method according to claim 3, wherein, prior to charging of the power storage device by the charging device being started, the value indicating the state of the storage battery received by at least one of the charging device and the power storage device is a capacity of the storage battery from prior to charging of the power storage device by the charging device being started, and the value indicating the past state of the storage battery is a capacity from when charging of the storage battery has been completed in the past.

5. A server device, comprising:

a receiver that receives identification information of a power storage device that is connected to a charging device, and a value indicating a state of a storage battery included in the power storage device, from at least one of the charging device and the power storage device;

a storage that associates to each other and stores the identification information of the power storage device and a history of the value indicating the state of the storage battery;

a determiner that determines a possibility of charging the power storage device by comparing the value indicating the state of the storage battery received by the receiver with a value indicating a past state of the storage battery that corresponds to the identification information of the power storage device received by the receiver and is stored in the storage; and a transmitter that transmits information indicating the possibility of charging the power storage device determined by the determiner to at least one of the charging device and the power storage device wherein the determiner permits charging the power storage device by the charging device when charging the power storage device is determined as being possible, and the determiner prohibits charging the power storage device by the charging device when charging the power storage device is determined as not being possible.

* * * * *